US010027949B2

(12) United States Patent
Kato

(10) Patent No.: US 10,027,949 B2
(45) Date of Patent: Jul. 17, 2018

(54) IMAGE PROCESSING APPARATUS, IMAGE PROCESSING METHOD, AND RECORDING MEDIUM

(71) Applicant: CANON KABUSHIKI KAISHA, Tokyo (JP)

(72) Inventor: Yuji Kato, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 324 days.

(21) Appl. No.: 15/065,124

(22) Filed: Mar. 9, 2016

(65) Prior Publication Data

US 2016/0269717 A1 Sep. 15, 2016

(30) Foreign Application Priority Data

Mar. 12, 2015 (JP) ................................. 2015-049976

(51) Int. Cl.
*H04N 13/02* (2006.01)
*H04N 13/00* (2018.01)

(52) U.S. Cl.
CPC ..... *H04N 13/0242* (2013.01); *H04N 13/0239* (2013.01); *H04N 2013/0081* (2013.01)

(58) Field of Classification Search
None
See application file for complete search history.

(56) References Cited

U.S. PATENT DOCUMENTS

| 2012/0019613 A1* | 1/2012 | Murray | H04N 13/0007 |
| | | | 348/36 |
| 2012/0155786 A1* | 6/2012 | Zargarpour | G03B 35/08 |
| | | | 382/284 |
| 2013/0335521 A1* | 12/2013 | Lin | H04N 13/0203 |
| | | | 348/36 |

FOREIGN PATENT DOCUMENTS

WO 2012002046 A1 1/2012

OTHER PUBLICATIONS

Tao Yan et al., "Seamless Stitching of Stereo Images for Generating Infinite Panoramas", VRST'13, Oct. 6-9, 2013; Singapore, Singapore; Association for Computing Machinery; 7 pages.*

* cited by examiner

*Primary Examiner* — Kaitlin A Retallick
(74) *Attorney, Agent, or Firm* — Canon U.S.A., Inc. IP Division

(57) ABSTRACT

Based on a disparity amount of an object image in a left-eye viewpoint and a right-eye viewpoint and a seam position decided for one of the left-eye viewpoint and the right-eye viewpoint, a seam position of the other viewpoint is decided, and a panoramic image for left eye and a panoramic image for right eye are generated by using the decided seam position.

13 Claims, 8 Drawing Sheets

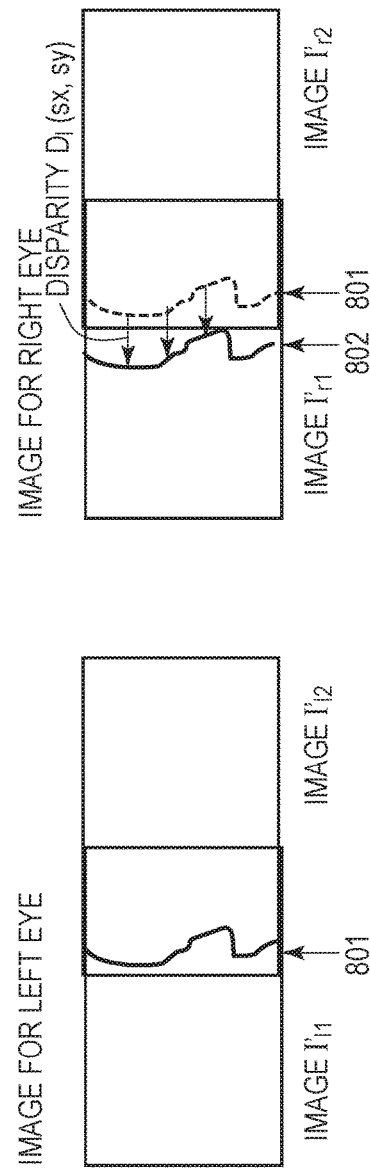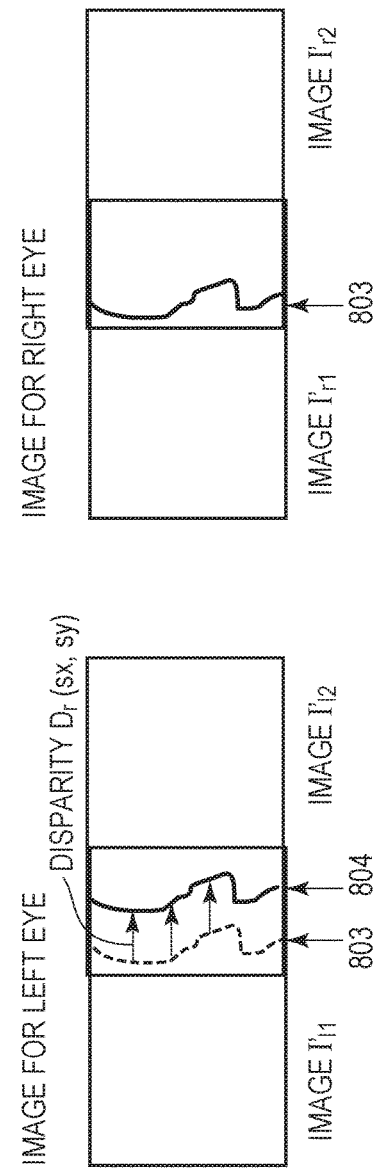

IMAGE PROCESSING APPARATUS, IMAGE PROCESSING METHOD, AND RECORDING MEDIUM

BACKGROUND OF THE INVENTION

Field of the Invention

The present disclosure generally relates to image processing and, more particularly, to an image processing apparatus, an image processing method, a recording medium, and to processing for synthesizing a plurality of images to generate a panoramic image for stereo viewing.

Description of the Related Art

A technique of taking a stereo panoramic image is demanded in order to acquire a video image with a high sense of reality. As the technique therefor, there is a method for taking a stereo panoramic image by using a plurality of cameras (WO12/002046, and Yan Tao, "Seamless Stitching of Stereo Images for Generating Infinite Panoramas", "Proceedings of the 19th ACM Symposium on Virtual Reality Software and Technology", Singapore, ACM, 2013, 251-258 (hereinafter, represented as Yan Tao)). WO12/002046 describes that a panoramic image for left eye is generated by stitching a plurality of images for left eye taken by rotating a set of stereo cameras, and a panoramic image for right eye is generated by stitching images for right eye. Yan Tao describes that positions of seams between a plurality of images for left eye and a plurality of images for right eye at a time of stitching are decided by using an evaluation function in which a disparity amount between the images for left eye and the images for right eye is taken into consideration.

In a technique described in WO12/002046, the seam positions between the images for left eye and the images for right eye at a time of stitching are decided in advance, and difference between disparities caused by variation of a distance to an object is not considered. Therefore, at a time of viewing a stereo image, seams are generated at different positions of the images for left eye and the images for right eye in a scene. In this case, there is a problem that a phenomenon called binocular rivalry that feeling of discomfort or unpleasantness is caused when a video image in which positional relationships are inconsistent or different between the right eye and the left eye is presented occurs near the seams of the images. On the other hand, in a technique of Yan Tao, by using the evaluation function with consideration of a disparity of images when deciding a seam of the images, it is set so that the seams are easily set at close positions in the images for left eye and the images for right in a scene. However, only by adding a term in which the disparity of the images is considered to the evaluation function, the seam positions are not always matched between the right and left images because of other terms included in the evaluation function, and binocular rivalry may occur during viewing. Thus, in the technique, when images for left eye and images for right eye which are used for stereo viewing are generated by image stitching, binocular rivalry caused by a difference of seam positions of the images is suppressed.

SUMMARY OF THE INVENTION

An image processing apparatus according an aspect of the present disclosure is an image processing apparatus for generating a panoramic image used for stereo viewing, including: an image acquiring unit configured to acquire a first image for left eye which is viewed from a first left-eye viewpoint, a first image for right eye which is viewed from a first right-eye viewpoint separated from the first left-eye viewpoint by a predetermined distance, a second image for left eye which is viewed from a second left-eye viewpoint different from the first left-eye viewpoint and has a first overlapping area which is an image area overlapping with the first image for left eye, and a second image for right eye which is viewed from a second right-eye viewpoint separated from the second left-eye viewpoint by the predetermined distance and has a second overlapping area which is an image area overlapping with the second image for right eye; a positioning unit configured to perform positioning of the first image for left eye and the second image for left eye to be overlapped with the first overlapping area, and positioning of the first image for right eye and the second image for right eye to be overlapped with the second overlapping area; a decision unit configured to decide a first position which is a position of a seam at which the first image for left eye and the second image for left eye which are positioned by the positioning unit are combined, and a second position which is a position of a seam at which the first image for right eye and the second image for right eye which are positioned by the positioning unit are combined; and a generation unit configured to synthesize the first image for left eye and the second image for left eye by using the first position to thereby generate a panoramic image for left eye and synthesize the first image for right eye and the second image for right eye by using the second position to thereby generate a panoramic image for right eye, in which the decision unit decides a first seam position of the first position and the second position, and then decides a second seam position based on the first seam position and a disparity amount of an object at the first seam position.

Further features of the disclosure will become apparent from the following description of exemplary embodiments with reference to the attached drawings.

BRIEF DESCRIPTION OF THE DRAWINGS

FIGS. 8A and 8B are diagrams illustrating a method for deciding a seam position in the exemplary embodiment 2.

DESCRIPTION OF THE EMBODIMENTS

Figure 1:
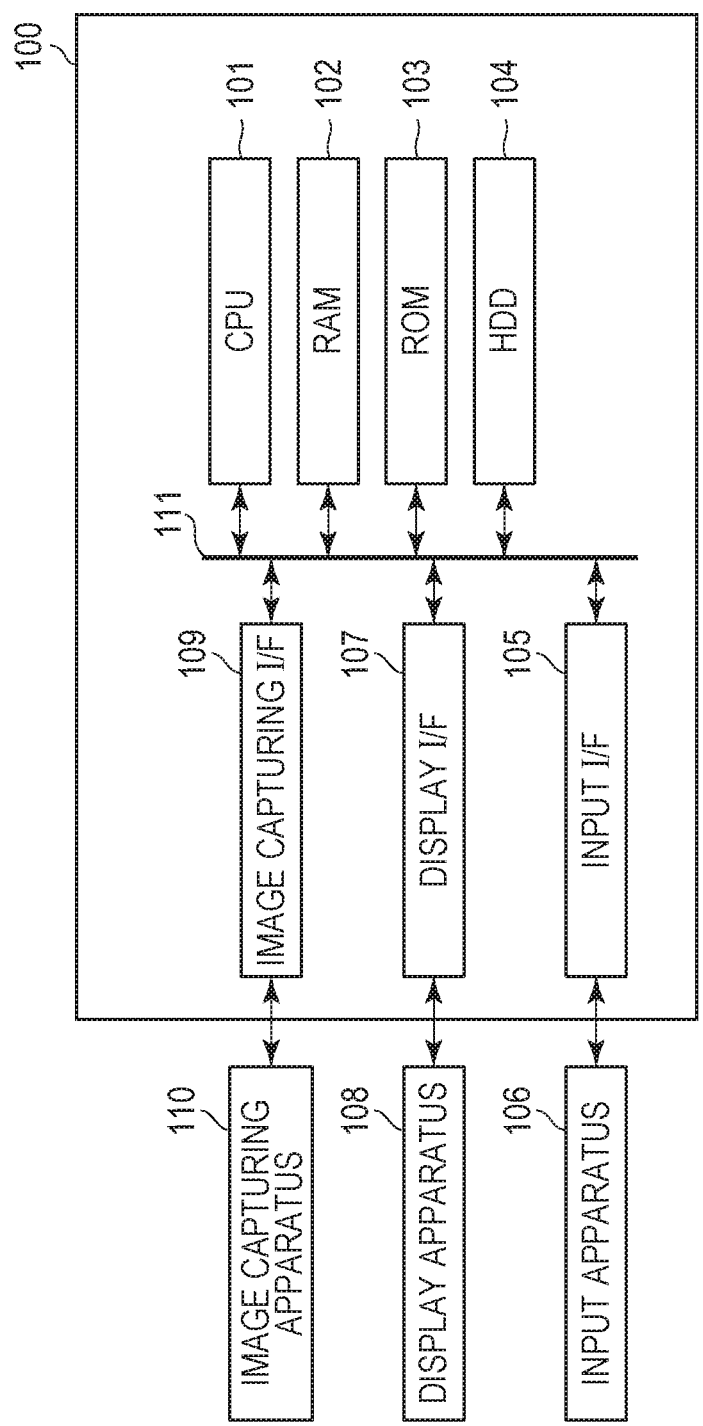
FIG. 1 is a block diagram illustrating a configuration of an image processing apparatus.

Description will hereinafter be given for embodiments of the disclosure with reference to drawings. Note that, the following embodiments are not intended to limit the disclosure, and not all of the combinations of the aspects that are described in the embodiments are necessarily required with respect to the means to solve the problems according to the disclosure. Note that the same configurations will be described with the same reference numerals assigned.

Exemplary Embodiment 1

Described in an exemplary embodiment 1 is an example in which based on a disparity between a panoramic image for left eye and a panoramic image for right eye, and a seam position decided for one of the panoramic image for left eye and the panoramic image for right eye, a seam position in the other image is decided. FIG. 1 is a diagram illustrating a system configuration of an image processing apparatus according to the present exemplary embodiment.

An image processing apparatus 100 has a central processing unit (CPU) 101, a random access memory (RAM) 102, a read-only memory (ROM) 103, a hard disk drive (HDD) 104, an input interface (I/F) 105, a display interface (I/F) 107, an image capturing interface (I/F) 109, and a system bus 111. As used herein, the term "unit" generally refers to any combination of software, firmware, hardware, or other component, such as circuitry, that is used to effectuate a purpose.

The CPU 101 may be configured with one or more processors for integrally controlling each unit in the image processing apparatus 100. The RAM 102 may be configured with one or more memories functioning as a main memory, a work area, and the like. The ROM 103 may be configured with one or more memories in which programs executed by the CPU 101 is stored. The HDD 104 is a storage medium in which an application program executed by the CPU 101, data used for image processing, and the like are stored. The input I/F 105 is a serial bus interface, for example, such as a Universal Serial Bus (USB) or Institute of Electrical and Electronic Engineers (IEEE) 1394, and is used for connecting an input apparatus 106, such as a keyboard or a mouse, for performing various instruction operations by a user. The display I/F 107 is an image output interface, for example, such as Digital Visual Interface (DVI) or High Definition Multimedia Interface (HDMI) (registered trademark), and is used for connecting a display apparatus 108 such as a liquid crystal display. The image capturing I/F 109 is an image input interface, for example, such as 3G/HD-SDI or HDMI (registered trademark), and is used for connecting an image capturing apparatus 110 for acquiring digital image data by image capturing.

Figure 2:
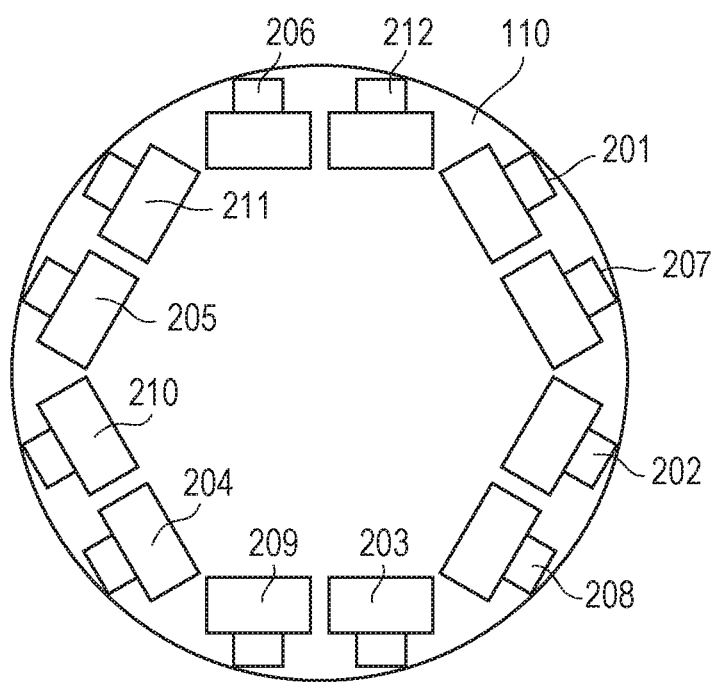
FIG. 2 is a diagram illustrating an example of an image capturing apparatus.

The image capturing apparatus 110 has six pairs of stereo cameras. In each of the pairs, two image capturing units having the same optical system are arranged at a predetermined interval so that optical axes become in parallel as illustrated in FIG. 2. The stereo cameras face mutually different directions. The optical systems of the stereo cameras are all the same, and intervals between the respective stereo cameras are also the same. Image capturing units 201 to 206 correspond to left-eye viewpoints of the respective stereo cameras, and image capturing units 207 to 212 correspond to right-eye viewpoints of the respective stereo cameras. Each of the image capturing units 201 to 212 has a lens with a wide viewing angle like a fisheye lens, and the viewing angle of the image capturing units 201 to 212 are designed so as to allow image capturing 360 degrees around the image capturing apparatus 110. At this time, the viewing angles of the image capturing units 201 to 212 are set so that the adjacent image capturing units with the same type of viewpoint (for example, the image capturing unit 201 and the image capturing unit 202) have image areas which overlap with each other. Note that, the configuration of the image capturing apparatus 110 is not limited to the above, and the disclosure may be applied, for example, even when only two pairs of stereo cameras are provided. The respective stereo cameras do not need to be configured so that the imaging units are integrated, and may use different cameras as long as an image capturing unit for left eye and an image capturing unit for right eye are arranged at a predetermined interval.

Figure 3:
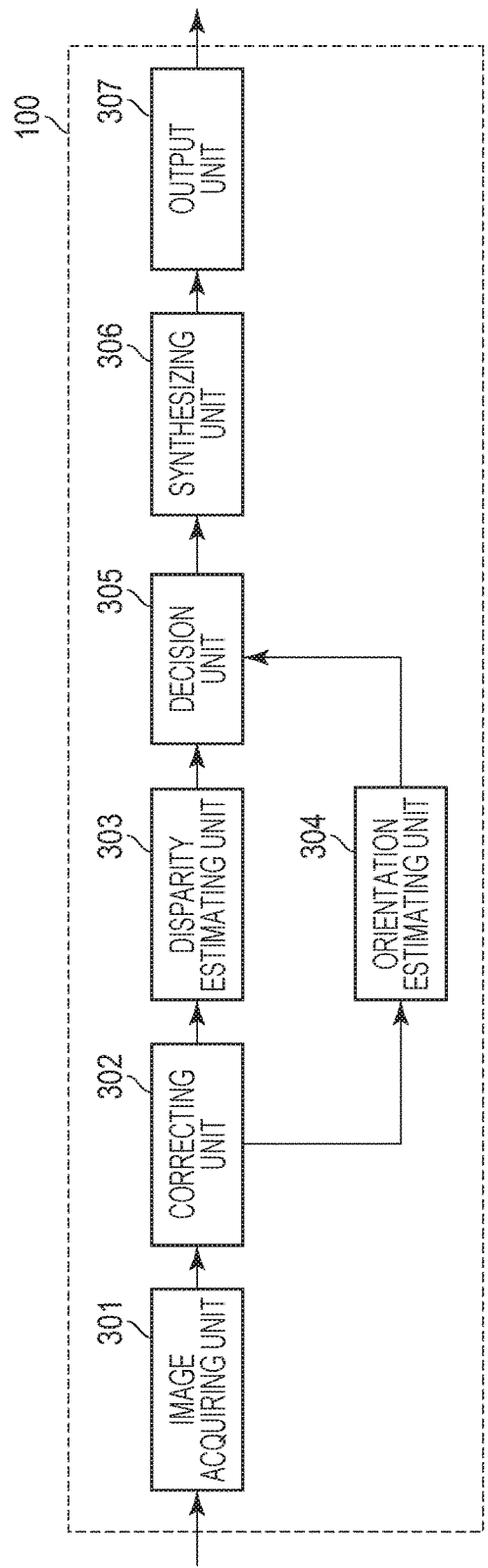
FIG. 3 is a block diagram illustrating a functional configuration of the image processing apparatus in an exemplary embodiment 1.

A flow of processing performed by the image processing apparatus 100 of the present exemplary embodiment will be described below with reference to FIG. 3 and FIG. 4. FIG. 3 is a block diagram illustrating a functional configuration of the image processing apparatus 100 in the present exemplary embodiment. The CPU 101 serves as each functional bock illustrated in FIG. 3 by reading out the program stored in the ROM 103 or the HDD 104 and executing the program with the RAM 102 as a work area. Note that, the CPU 101 does not need to serve as all of the functional blocks, and a dedicated processing circuit corresponding to each functional block may be provided.

Figure 4:
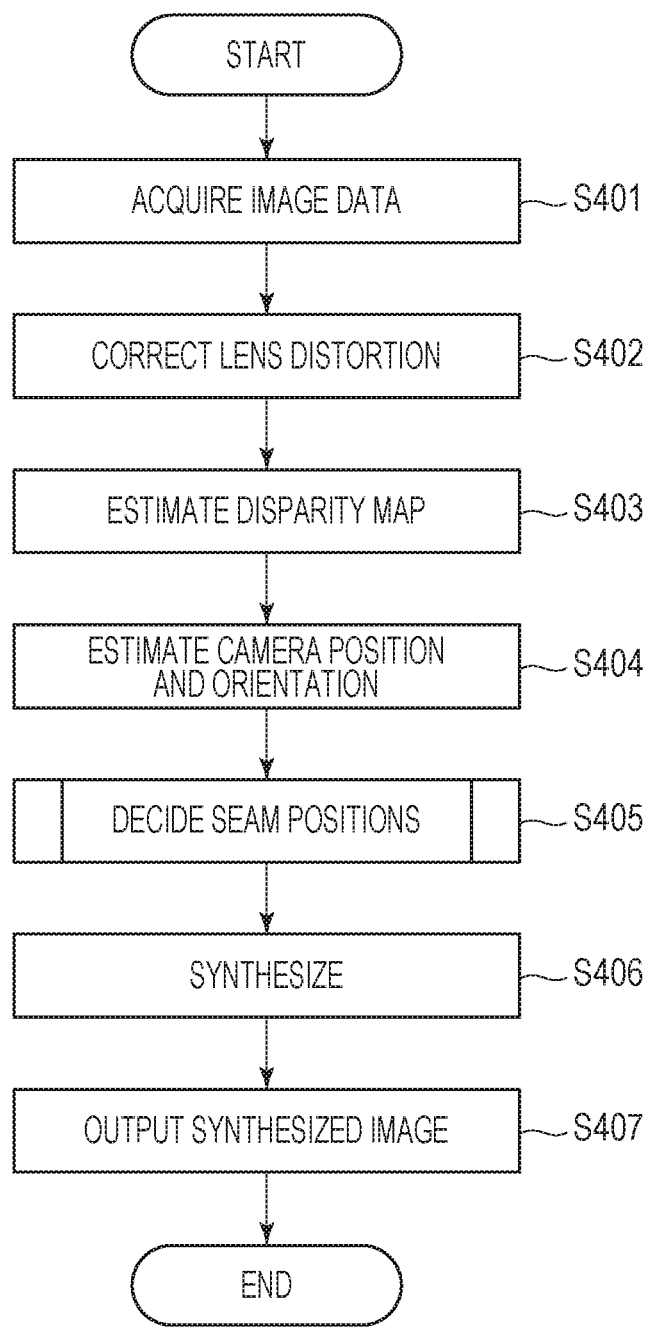
FIG. 4 is a flowchart illustrating a flow of processing in the image processing apparatus of the exemplary embodiment 1.

FIG. 4 is a flowchart illustrating a flow of processing performed in the image processing apparatus 100 in the present exemplary embodiment. At step S401, an image acquiring unit 301 acquires captured image data captured by the image capturing apparatus 110. The captured image data which is directly input from the image capturing apparatus 110 may be acquired or the captured image data which is temporarily saved in the RAM 102 or the HDD 104 may be acquired. Among the captured image data which is acquired, image data captured by the image capturing units 201 to 206 on the left side of the respective stereo cameras is $I_{l1}$ to $I_{l6}$, and image data captured by the image capturing units 207 to 212 on the right side of the respective stereo cameras is $I_{r1}$ to $I_{r6}$. The image acquiring unit 301 outputs the image data $I_{l1}$ to $I_{l6}$ and $I_{r1}$ to $I_{r6}$ to a correction unit 302.

At step S402, the correction unit 302 performs processing for correcting lens distortion for the image data input from the image acquiring unit 301 and generates image data subjected to distortion correction $I'_{l1}$ to $I'_{l6}$ and $I'_{r1}$ to $I'_{r6}$. As the processing for correcting lens distortion, for example, a known method for performing rearrangement of pixels based on lens characteristics of the respective image capturing units may be used. The correction unit 302 outputs the image data subjected to distortion correction $I'_{l1}$ to $I'_{l6}$ and $I'_{r1}$ to $I'_{r6}$ to a disparity estimating unit 303 and an orientation estimating unit 304.

At step S403, the disparity estimating unit 303 estimates disparity maps $D'_{l1}$ to $D'_{l6}$ between image data for left eye (hereinafter, referred to as image for left eye) and image data for right eye (hereinafter, referred to as image for right eye) captured by the respective stereo cameras. The disparity maps $D'_{l1}$ to $D'_{l6}$ are maps for representing how much a corresponding pixel in the images for right eye $I'_{r1}$ to $I'_{r6}$ is shifted from each pixel in the images for left eye $I'_{l1}$ to $I'_{l6}$ in an image coordinate. The disparity estimating unit 303 performs rectification processing related to the image data for left eye for the images for right eye. As the rectification processing, for example, a known method for obtaining a homography matrix, in which the image for right eye becomes in parallel to the image for left eye, based on positions of feature points respectively extracted in the image data may be used. Next, the disparity estimating unit 303 searches for corresponding pixels in the image for right eye which are rectified with respect to respective pixels of the image for left eye by block matching in a horizontal direction. When a pixel of the image for right eye corresponding to a pixel a of the image for left eye is a pixel b, a value obtained by subtracting an x-coordinate of the pixel a from an x-coordinate of the corresponding pixel b is set as a value of a disparity corresponding to the pixel a. This is performed for the respective pixels of the images for left eye $I'_{l1}$ to $I'_{l6}$ to estimate the disparity maps $D'_{l1}$ to $D'_{l6}$ (x, y) by the disparity estimating unit 303. Note that, since a disparity value in each pixel is a value depending on a distance to an object corresponding to each pixel, the disparity value may be estimated not by block matching of images, but based on distance information in each pixel, which is acquired by an infrared sensor or the like. The disparity estimating unit 303 outputs the estimated disparity maps $D'_{l1}$ to $D'_{l6}$ to a decision unit 305.

At step S404, the orientation estimating unit 304 estimates positions and orientations of the image capturing units 201 to 206 which have captured the images for left eye. As a method for estimating the positions and orientations, for example, a Direct Linear Transformation method may be used. Specifically, a plurality of feature points are extracted from the respective images for left eye $I'_{l1}$ to $I'_{l6}$, and the feature points extracted from the adjacent image capturing units for left eye are associated with each other. Then, by obtaining a projection transformation matrix for matching positions of the respective feature points based on a result of association, a relative position and orientation relationship of the respective image capturing units 201 to 206 is decided. The orientation estimating unit 304 performs similar processing also for the image capturing units 207 to 212 which have captured the images for right eye, and outputs the estimated positions and orientations to the decision unit 305.

At step S405, the decision unit 305 decides seam positions of the respective images for a case where the respective images for left eye are combined to generate panoramic image data for left eye and a case where the respective images for right eye are combined to generate panoramic image data for right eye. Note that, the seam here means a position, which serves as a reference of switching weighting of pixel values of two images, in the two images to be combined. Processing carried out here will be described below in detail. The decision unit 305 outputs the seam positions which are decided here to a synthesizing unit 306.

At step S406, the synthesizing unit 306 synthesizes respective image data based on the seam positions input from the decision unit 305. Here, the synthesizing unit 306 synthesizes the images for left eye $I'_{l1}$ to $I'_{l6}$ to thereby generate panoramic image data for left eye $P_l$, and synthesizes the rectified images for right eye $I'_{r1}$ to $I'_{r6}$ to thereby generate panoramic image data for right eye $P_r$. The synthesizing unit 306 projects the respective images for left eye at a coordinate system of an output image based on the positions and orientations of the respective cameras input from the orientation estimating unit 304. As the coordinate system of the output image, for example, a coordinate system in which a y-coordinate of an image is set as a vertical axis and a rotation angle about a y-axis with the center of the image capturing apparatus 110 as an origin is set as a horizontal axis, or the like is used. In an overlapping area of the respective images, by using a weight according to a distance from the seam position input from the decision unit 305, pixel values of the overlapping images are blended. For example, in an overlapping area of $I'_{l1}$ and $I'_{l2}$, with the seam position input from the decision unit 305 as a boundary, the pixel values are synthesized by increasing the weight of $I'_{l1}$ in the $I'_{l1}$ side and increasing the weight of $I'_{l2}$ in the $I'_{l2}$ side. Note that, an image whose pixel value is used may be switched simply with a seam as a boundary without performing synthesizing of the pixel values. The synthesizing unit 306 outputs the generated panoramic image data $P_l$ and $P_r$ to an output unit 307.

At step S407, the output unit 307 outputs the panoramic image data $P_l$ and $P_r$ input from the synthesizing unit 306 to the HDD 104 and the display apparatus 108 to end the processing.

Figure 5:
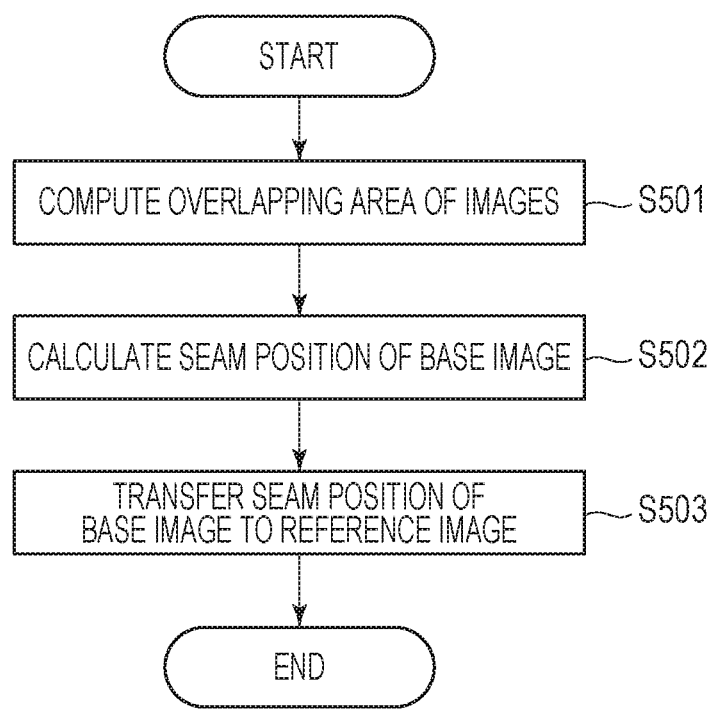
FIG. 5 is a flowchart illustrating a flow of processing for deciding seam positions in the exemplary embodiment 1.

The flow of the processing performed in the image processing apparatus 100 of the present exemplary embodiment is as described above. Next, processing for deciding seams which is performed at the decision unit 305 (step S405) will be described in detail with reference to FIG. 5. FIG. 5 is a flowchart illustrating a detailed flow of the processing at step S405.

At step S501, the decision unit 305 derives an overlapping area of images whose image capturing regions are mutually overlapped among the respective images for left eye. Described here is a method for computing an overlapping area between the images $I'_{l1}$ and $I'_{l2}$ which are respectively captured by the image capturing unit 201 and the image capturing unit 202. The decision unit 305 converts each pixel of $I'_{l2}$ into a coordinate system of $I'_{l1}$ based on position and orientation information of the respective image capturing units input from the orientation estimating unit 304 and disparity information of an object at each pixel. The decision unit 305 then sets an area in which the respective converted pixels of $I'_{l2}$ overlap with $I'_{l1}$ as an overlapping area, and stores a pixel position at a left end of the overlapping area and a pixel position at a right end of the overlapping area. The decision unit 305 performs such processing for all adjacent images for left eye. The decision unit 305 performs the similar processing also for the respective images for right eye.

At step S502, the decision unit 305 decides a seam position at which the respective images for left eye are combined based on the overlapping area of a set of the images for left eye, which is derived at step S501. For deciding the seam, the decision unit 305 performs labeling as to a pixel of which image of the overlapping images to be kept at a time of stitching for all the pixels of the overlapping area. A label is decided by minimizing a value of a cost function (cost value) with a label of the overlapping area as a variable, and a boundary at which the decided label is switched is set as the seam position. The cost function C used for labeling is composed of a data term D and a smooth term S, and is represented as $C=D+w\times S$. The data term D represents a cost computed in a pixel of interest alone, the smooth term S represents a cost computed from the pixel of interest and a peripheral pixel thereof, and w represents a weight of the smooth term S for the data term D. Note that, the data term D and the smooth term S may include a plurality of cost functions. For example, as the data term D, a function by which a cost of a pixel in the left side in the overlapping area is increased and a cost in the right side is decreased may be used by considering that the seam position moves to the left side when a seam for left eye is transferred to an image for right eye at following step S503. Further, a distance from the center of the image designated by the labeling to the pixel of interest, and the like may be used. In the smooth term S, the cost based on a distance between values of adjacent pixels, a distance between labels of the adjacent pixels, or the like is decided. For example, a function by which a cost is decreased when a difference between a pixel value of a target pixel of cost computation and a pixel value of an adjacent pixel, or a function by which a cost is decreased when adjacent labels are the same labels may be used. Note that, for the data term D and the smooth term S, a function using other reference such as smoothness of gradient or smoothness of a disparity, in addition to a pixel position or a pixel value, may be used.

Figure 6:
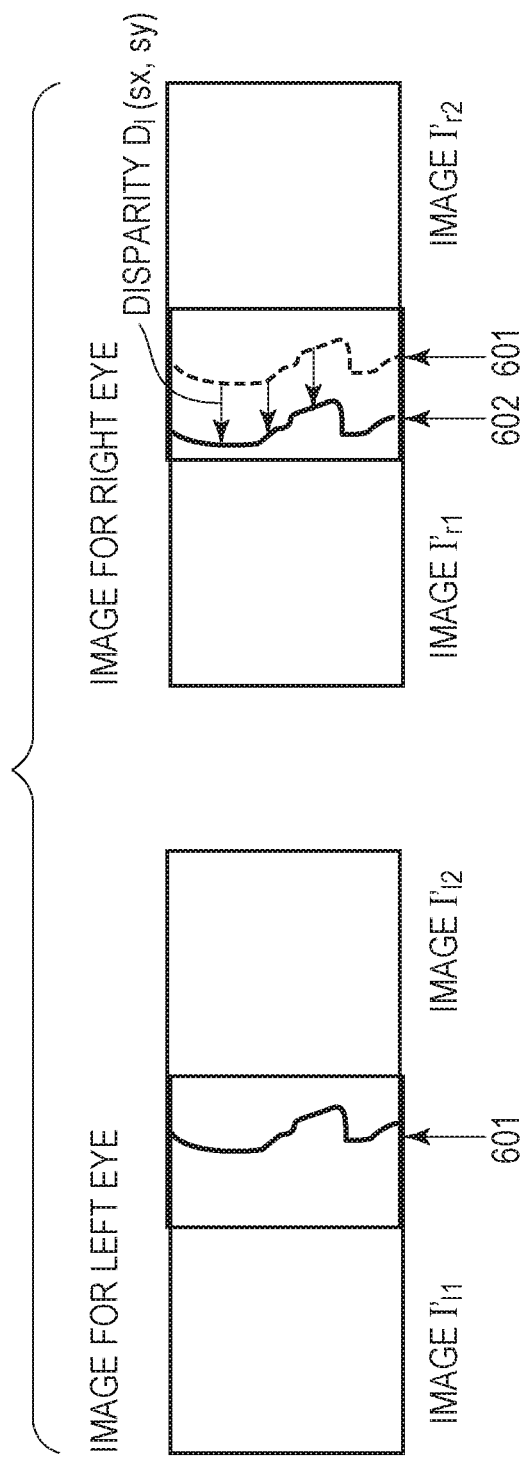
FIG. 6 is a diagram illustrating a method for deciding a seam position in the exemplary embodiment 1.

At step S503, the seam position (sx, sy) obtained at step S502 is transferred to the image for right eye. In this case, the image for left eye is referred to as a base image and the image for right eye is referred to as a reference image. FIG. 6 is a diagram illustrating a transfer of the seam position by taking the images $I'_{l1}$, $I'_{l2}$, $I'_{r1}$ and $I'_{r2}$ as an example. A curve 601 indicates a seam decided at step S502 when the images $I'_{l1}$ and $I'_{l2}$ are combined. The images $I'_{r1}$ and $I'_{r2}$ are images which are taken from a viewpoint toward the right by a predetermined distance from that of the images $I'_{l1}$, $I'_{l2}$, and therefore become images in which respective object images of the images $I'_{l1}$ and $I'_{l2}$ are shifted to the left. Thus, when the seam position decided for the images $I'_{l1}$ and $I'_{l2}$ is applied to a case of the images $I'_{r1}$ and $I'_{r2}$, the seam is formed at a position of an image of an object which is present rightward from that of the images $I'_{l1}$ and $I'_{l2}$, so that binocular rivalry is caused. Thus, the decision unit 305 sets a position obtained by shifting the seam position (sx, sy) decided at step S502 to the left by a disparity amount of an object, which corresponds to the position, as the seam position of the images $I'_{r1}$ and $I'_{r2}$. In this case, a position of a seam 602 to be obtained is (sx −$D_l$ (sx, sy), sy).

Note that, only by simply shifting the seam position by the corresponding disparity amount, for example, the entire position of the seam 602 is not included in the overlapping area of the images $I'_{r1}$ and $I'_{r2}$ and a part thereof is protruded in some cases. In this case, the seam 602 is clipped so that the seam 602 falls within the overlapping area. Specifically, a shape of the seam 602 is changed so that the protruded area matches a left end of the overlapping area (the protruded seam position is moved), and a shape of the seam for left eye is also changed to a similar shape. In addition, in order to prevent protrusion itself of the seam 602, the left end of the overlapping area of the image for left eye may be shifted to the right by a maximum disparity amount of an object included in the overlapping area in advance to derive the seam position of the image for left eye in the reduced overlapping area.

The processing performed in the image processing apparatus 100 of the present exemplary embodiment is as described above. With the processing above, the seams of the images are set at the same position in a scene between the panoramic image for left eye and the panoramic image for right eye, so that it is possible to inhibit binocular rivalry at a time of stereo viewing. Note that, though description has been given in the present exemplary embodiment with the image for left eye as a base image, the seam position derived for the image for right eye may be transferred to the image for left eye with the image for right eye as the base. In this case, it is only required to perform similar processing by switching standpoints of the right eye and the left eye in all processing.

Note that, in the present exemplary embodiment, the image acquiring unit 301 functions as an image acquiring unit configured to acquire a plurality of images for left eye and a plurality of images for right eye. The decision unit 305 functions as a positioning unit configured to perform positioning so that overlapping areas of the plurality of images for left eye are superimposed with each other and perform positioning so that overlapping areas of the plurality of images for right eye are superimposed with each other. Further, the decision unit 305 functions as a decision unit configured to decide a seam position when the images for left eye subjected to the positioning are combined and a seam position when the images for right eye subjected to the positioning are combined. The synthesizing unit 306 functions as a generation unit configured to synthesize the plurality of images for left eye to thereby generate a panoramic image for left eye and synthesize the plurality of images for right eye to thereby generate a panoramic image for right eye by using the seam positions decided by the decision unit.

Exemplary Embodiment 2

Description has been given in the exemplary embodiment 1 for an example that binocular rivalry is inhibited by transferring the seam position decided in the base viewpoint to another viewpoint. In an exemplary embodiment 2, description will be given for an example in which seam positions are decided individually for each of images for left eye and images for right eye, both of them are compared, and based on a result of the comparison, the seam position of one image is selected and transferred to the other image. Note that, the description for the similar configuration to that of the exemplary embodiment 1 will be omitted and only a point different from that of the exemplary embodiment 1 will be described. The exemplary embodiment 2 is different from the exemplary embodiment 1 in the processing at step S403 and step S405.

At step S403 of the exemplary embodiment 1, the disparity estimating unit 303 estimates only the disparity maps $D'_{l1}$ to $D'_{l6}$ based on the images for left eye $I'_{l1}$ to $I'_{l6}$. At step S403 of the present exemplary embodiment, the disparity estimating unit 303 further estimates disparity maps $D'_{r1}$ to $D'_{r6}$ based on the rectified images for right eye $I'_{r1}$ to $I'_{r6}$ in addition to the disparity maps $D'_{l1}$ to $D'_{l6}$. The disparity maps $D'_{r1}$ to $D'_{r6}$ are estimated in a similar manner to the disparity maps $D'_{l1}$ to $D'_{l6}$ except for that a base relation between right and left images used for estimating the disparity maps $D'_{l1}$ to $D'_{l6}$ is reversed.

Figure 7:
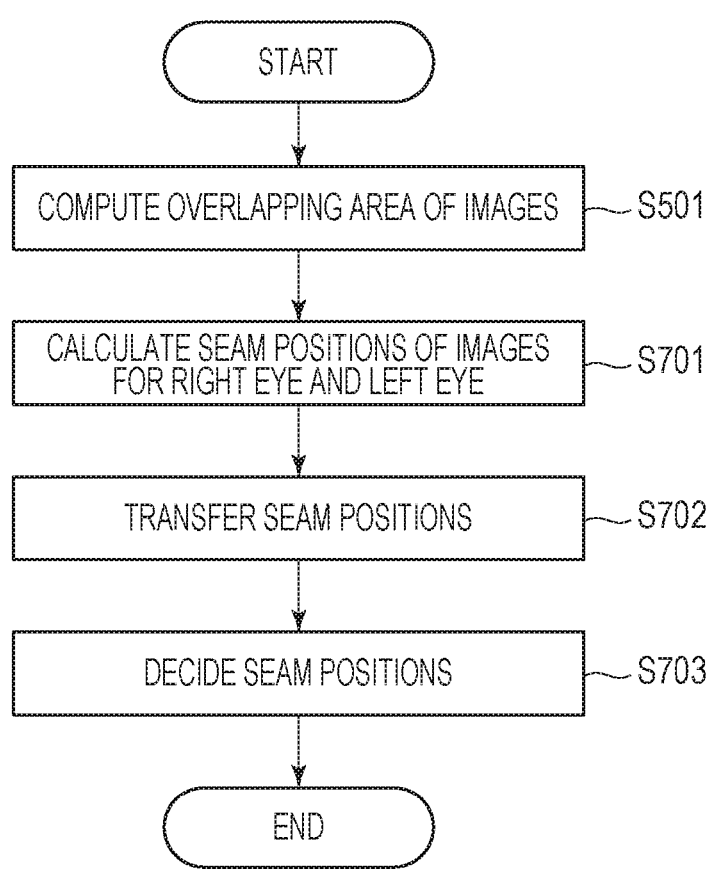
FIG. 7 is a flowchart illustrating a flow of processing for deciding a seam position in an exemplary embodiment 2.

Next, a different point of processing at step S405 will be described. FIG. 7 is a flowchart illustrating a flow of the processing at step S405 in the present exemplary embodiment.

At step S701, the decision unit 305 decides seam positions in each of an overlapping area of the images for left eye and an overlapping area of the images for right eye. Although the seam positions are decided in a similar method to that of the exemplary embodiment 1, the data term D of the cost function is changed according to the images for right eye when deciding the seam position of the images for right eye.

At step S702, the decision unit 305 transfers each of the seam position of the images for left eye and the seam position of the images for right eye to a viewpoint position of the other in the similar manner to that of step S503, and obtains the seam positions after the transfer.

At step S703, the decision unit 305 decides the seam position of the images for left eye and the seam position of the images for right eye based on the seam positions after the transfer. A method for deciding the seam positions varies depending on whether or not the respective seams satisfy following conditions. First, when none of the transferred seam positions of the images for left eye and the images for right eye is protruded from the overlapping area, the decision unit 305 employs the seam having a smaller total value of cost functions of the overlapping area corresponding to each of the seams. For example, when the seam position of the images for left eye has a smaller total value of cost functions, the seam position decided at step S701 is used for the images for left eye and the seam position obtained by transferring the seam position of the images for left eye based on a disparity is used for the images for right eye. Values of the cost functions may be considered as evaluation values indicating evaluation as the seam positions.

When either one of the transferred seam positions is protruded from the overlapping area of the images, the seam which is not protruded from the overlapping area of the images is employed. For example, this is applied to a case where the seam position 802 obtained by transferring the seam position 801 of the images for left eye to the images for right eye is protruded from the overlapping area as illustrated in FIG. 8A. In this case, as illustrated in FIG. 8B, the seam position 803 decided at step S701 is used for the images for right eye and the seam position 804 obtained by transferring the seam position of the images for right eye is used for the images for left eye.

Finally, when both of the transferred seam positions of the images for left eye and the images for right eye are protruded from the overlapping areas, the respective seams are clipped and the seam position having a smaller total value of cost functions in the overlapping area when the clipped seam is used is employed as the base seam position. With the processing described above, it is possible to decide a more robust seam position for an object included in an image.

Other Exemplary Embodiment

The disclosure may be realized also in processing in which a program which realizes one or more functions of the aforementioned exemplary embodiments is supplied to a system or an apparatus through a network or a storage medium, and one or more processors in a computer of the system or the apparatus reads and executes the program. Further, the disclosure may be realized also by a circuit which realizes one or more functions (for example, ASIC).

According to the disclosure, when images for left eye and images for right eye which are used for stereo viewing are generated by image stitching, binocular rivalry due to a difference of seam positions between the images is able to be reduced.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-049976, filed on Mar. 12, 2015, which is hereby incorporated by reference herein in its entirety.

What is claimed is:

1. An image processing apparatus for generating a panoramic image used for stereo viewing, the apparatus comprising:
   an image acquiring unit configured to acquire a first image for left eye which is viewed from a first left-eye viewpoint, a first image for right eye which is viewed from a first right-eye viewpoint separated from the first left-eye viewpoint by a predetermined distance, a second image for left eye which is viewed from a second left-eye viewpoint different from the first left-eye viewpoint and has a first overlapping area which is an image area overlapping with the first image for left eye, and a second image for right eye which is viewed from a second right-eye viewpoint separated from the second left-eye viewpoint by the predetermined distance and has a second overlapping area which is an image area overlapping with the second image for right eye;
   a positioning unit configured to perform positioning of the first image for left eye and the second image for left eye to be overlapped with the first overlapping area, and positioning of the first image for right eye and the second image for right eye to be overlapped with the second overlapping area;
   a decision unit configured to decide a first position which is a position of a seam at which the first image for left eye and the second image for left eye which are positioned by the positioning unit are combined, and a second position which is a position of a seam at which the first image for right eye and the second image for right eye which are positioned by the positioning unit are combined; and
   a generation unit configured to synthesize the first image for left eye and the second image for left eye by using the first position to thereby generate a panoramic image for left eye and synthesize the first image for right eye and the second image for right eye by using the second position to thereby generate a panoramic image for right eye, wherein
   the decision unit decides a first seam position of the first position and the second position, and then decides a second seam position based on the first seam position and a disparity amount of an object at the first seam position.

2. The image processing apparatus according to claim 1, wherein the decision unit decides a position, which is obtained by shifting the first seam position by the disparity amount of the object at the first seam position, as the second seam position.

3. The image processing apparatus according to claim 2, wherein the decision unit, when at least a part of the position obtained by shifting the first seam position by the disparity amount of the object at the first seam position is not included in an overlapping image area of images to be combined by using the second seam position, decides a position, which is obtained by moving a position not included in the overlapping image area of the position obtained by shifting the first seam position by the disparity amount of the object at the first seam position, so as to fall within the overlapping image area, as the second seam position.

4. The image processing apparatus according to claim 1, wherein the decision unit decides the first seam position based on a pixel position and a pixel value of a pixel included in an overlapping area corresponding to the first seam position among the first overlapping area and the second overlapping area.

5. The image processing apparatus according to claim 4, wherein the decision unit decides the first seam position by using a cost function based on the pixel position and the pixel value of the pixel included in the overlapping area corresponding to the first seam position.

6. The image processing apparatus according to claim 5, wherein the cost function includes a term by which a cost is decreased as a difference between a pixel value of a target pixel of cost calculation and a pixel value of a pixel adjacent to the target pixel becomes small.

7. The image processing apparatus according to claim 1, wherein the decision unit decides the first seam position based on a pixel value and a pixel position in a partial area of the overlapping image area, which are extracted based on disparity amount of an object image included in the overlapping area corresponding to the first seam position.

8. The image processing apparatus according to claim 1, wherein
the decision unit obtains the first position based on a pixel position and a pixel value of a pixel included in the first overlapping area and obtains a second position based on a pixel position and a pixel value of a pixel included in the second overlapping area,
compares the first position and the second position which are obtained,
selects one position of the first position and the second position as the first seam position based on a comparison result, and
changes the second seam position according to the one position which is selected.

9. The image processing apparatus according to claim 8, wherein, when a whole of a position obtained by shifting the first position by a disparity amount of an object image corresponding to the first position is included in the second overlapping area and a whole of a position obtained by shifting the second position by a disparity amount of an object image corresponding to the second position is included in the first overlapping area,
the decision unit decides one having a smaller cost value at a time of selection among the first position and the second position, as the one position.

10. The image processing apparatus according to claim 9, wherein, when at least a part of the position obtained by shifting the first position by the disparity amount of the object image corresponding to the first position is not included in the second overlapping area and at least a part of the position obtained by shifting the second position by the disparity amount of the object image corresponding to the second position is not included in the first overlapping area, the decision unit
corrects the first position such that a whole of the position obtained by shifting the first position by the disparity amount of the object image corresponding to the first position is included in the second overlapping area,
corrects the second position such that a whole of the position obtained by shifting the second position by the disparity amount of the object image corresponding to the second position is included in the first overlapping area, and
selects one having a smaller cost value at a time of selection among the first position and the second position which are corrected, as the one position.

11. The image processing apparatus according to claim 9, wherein the decision unit sets a first condition that a whole of a position obtained by shifting the first position by the disparity amount of the object image corresponding to the first position is included in the second overlapping area, and sets a second condition that a whole of a position obtained by shifting the second position by the disparity amount of the object image corresponding to the second position is included in the first overlapping area, and when only one of the first condition and the second condition is satisfied, selects a position satisfying the first condition or the second condition among the first position and the second position, as the one position.

12. An image processing method for generating a panoramic image used for stereo viewing, the method comprising:
an image acquiring step of acquiring a first image for left eye which is viewed from a first left-eye viewpoint, a first image for right eye which is viewed from a first right-eye viewpoint separated from the first left-eye viewpoint by a predetermined distance, a second image for left eye which is viewed from a second left-eye viewpoint different from the first left-eye viewpoint and has a first overlapping area which is an image area overlapping with the first image for left eye, and a second image for right eye which is viewed from a second right-eye viewpoint separated from the second left-eye viewpoint by the predetermined distance and has a second overlapping area which is an image area overlapping with the second image for right eye;
a positioning step of performing positioning of the first image for left eye and the second image for left eye to be overlapped with the first overlapping area, and positioning of the first image for right eye and the second image for right eye to be overlapped with the second overlapping area;
a decision step of deciding a first position which is a position of a seam at which the first image for left eye and the second image for left eye which are positioned by the positioning step are combined, and a second position which is a position of a seam at which the first image for right eye and the second image for right eye which are positioned by the positioning unit are combined; and
a generation step of synthesizing the first image for left eye and the second image for left eye by using the first position to thereby generate a panoramic image for left eye and synthesizing the first image for right eye and the second image for right eye by using the second position to thereby generate a panoramic image for right eye, wherein
at the decision step, a first seam position of the first position and the second position is decided, and then, a second seam position is decided based on the first seam position and a disparity amount of an object at the first seam position.

13. A computer-readable non-transitory recording medium storing therein a program for causing a computer to execute an image processing method having steps of:

an image acquiring step of acquiring a first image for left eye which is viewed from a first left-eye viewpoint, a first image for right eye which is viewed from a first right-eye viewpoint separated from the first left-eye viewpoint by a predetermined distance, a second image for left eye which is viewed from a second left-eye viewpoint different from the first left-eye viewpoint and has a first overlapping area which is an image area overlapping with the first image for left eye, and a second image for right eye which is viewed from a second right-eye viewpoint separated from the second left-eye viewpoint by the predetermined distance and has a second overlapping area which is an image area overlapping with the second image for right eye;

a positioning step of performing positioning of the first image for left eye and the second image for left eye to be overlapped with the first overlapping area, and positioning of the first image for right eye and the second image for right eye to be overlapped with the second overlapping area;

a decision step of deciding a first position which is a position of a seam at which the first image for left eye and the second image for left eye which are positioned at the positioning step are combined, and a second position which is a position of a seam at which the first image for right eye and the second image for right eye which are positioned at the positioning step are combined; and a generation step of synthesizing the first image for left eye and the second image for left eye by using the first position to thereby generate a panoramic image for left eye and synthesizing the first image for right eye and the second image for right eye by using the second position to thereby generate a panoramic image for right eye, wherein the decision step is a step at which a first seam position of the first position and the second position is decided, and then, a second seam position is decided based on the first seam position and a disparity amount of an object at the first seam position.

* * * * *